July 26, 1966 H. F. WELSH 3,263,031

HIGH-LOW FREQUENCY HOMING

Filed May 29, 1962 2 Sheets-Sheet 1

INVENTOR
HERBERT FRAZER WELSH

BY David [signature]

ATTORNEY

July 26, 1966 H. F. WELSH 3,263,031

HIGH-LOW FREQUENCY HOMING

Filed May 29, 1962 2 Sheets-Sheet 2

United States Patent Office 3,263,031

Patented July 26, 1966

3,263,031

HIGH-LOW FREQUENCY HOMING

Herbert Frazer Welsh, Philadelphia, Pa., assignor to Sperry Rand Corporation, New York, N.Y., a corporation of Delaware Filed May 29, 1962, Ser. No. 198,539

14 Claims. (Cl. 179—100.2)

This invention relates to devices for writing into and reading from a memory or storage device; more particularly to a device for accurately positioning a transducing means with relation to a given element or storage area upon such a storage device.

Due to the widespread acceptance of electronic data processing systems, it has become necessary to make available to such processing equipment, vast amounts of input data and to provide storage for the results of the processing. This medium for the receiving and storage of data is required to show the properties of rapid access, large storage capacity, and relative ease of obtaining the data stored within it. Further, such a storage device must be of a relatively permanent nature if the data placed upon it is to be retained for any period of time for later computational or data processing purposes. One medium which offers characteristics which meet all of the above requirements is the magnetic recording medium such as tape, disks or drums. The tape, for example, is light in weight, small in overall dimension, can store great amounts of data, can be readily stored, is relatively permanent when desired, but can readily be erased and can be made as large as desired for the individual use to which it is to be put. The only limitation upon the length that the tape may be made, is the problem of physical handling of the tape, that is, a device capable of moving the tape to permit accurately stopping and starting the tape. The width of the tape, however, is controlled by other considerations namely that of physical strength. The tape could be constructed in the form of a wire which might provide a single channel of information across its width, but such wire would be subjected to severe strain when the wire is stopped or started, and would be subject to elongation and breaking as a result. A wide flat tape would provide an answer to the problem of physical strength permitting the tape to be moved easily without fear of undue elongation or breaking. The same single channel of information could then be placed anywhere as desired along the width of the tape. However, the use of such a single channel on the width of the tape would waste a great deal of storage space which would be readily available. Thus, with modern techniques which permit magnetic recording of great density, it is possible to place a number of channels across the width of the same portion of tape. A large number of heads, one head for each channel desired to be placed across the tape, could then be provided to write onto or read from the tape, information placed thereon. These heads would be placed at a given location with respect to the tape, and means would be provided to see that the tape is moved in correct relationship with respect to the placement of the head arrangement. With such an arrangement, there is a great waste in reading and recording heads which must be provided and also in their related reading and writing amplifiers and circuitry. Further devices must be provided for accurately placing the tape and moving it in a position correct with respect to the placement of the heads.

The magnetic disk or drum provides a large storage capacity on its surface, which may be increased merely by increasing the diameter on both the drum or disk. However, by so doing certain additional difficulties are encountered which severely limit the increases in physical size which may be made. For example, by increasing the length or diameter, a larger mass is present which must be accurately moved placing burdens upon the drive means employed. Further, as the diameter is increased the access time, that is, the average time required to obtain desired data after such data is requested is increased thus decreasing the overall speed of the system. As a solution to these problems, the practice of high density recording, as described above, was also employed. In this manner it is possible to get more data upon a drum or disk which is of convenient size, as far as requirements for drive and access time. However, as described with reference to tape systems, it became necessary to provide a greater number of heads, with related circuitry, one for each track recorded along the periphery of the drum, perpendicular to its longitudinal axis, or to use a single head which could accurately be moved along a path parallel to the longitudinal axis, serving all the recorded tracks. This later practice greatly reduces the number of heads required and decreases the necessary associated circuitry. This approach, however, requires accurate positioning and this requirement is accented as the number of tracks is increased.

However, the particular problem set forth above with regard to the difficulty of accurately placing the tape or drum for movement in a position in proper relationship with the reading or writing heads is obviated, and further the desired task of reducing the required number of heads and their related read and write amplifiers in tape, drum and disk storage devices is achieved by the employment of a device constructed in accordance with the invention herein. Briefly stated, the invention consists of the use of a single head which can be moved in a path transverse to the direction of motion of the magnetic surface, and when desired, can be placed over a particular information track or group of tracks which is contained in parallel paths across the width of the magnetic medium, in the direction of the data motion. The individual tracks or group of tracks of information in one embodiment are separated by guide tracks so that each information track or group of tracks has a guide track to its left and a guide track to its right. In each of the alternate tracks there is recorded a low frequency homing tone, whereas in the remaining alternate guide tracks there is recorded a high frequency homing tone. After placing the head with respect to a desired information track which is in the nature of a course positioning, the signal received by the head from the two guide tracks is sent to additional circuitry to determine the relative position of the head with respect to the selected track. If there is a proper balance between the tones received from the guide tracks to its left and right, it is readily determined that the head is properly positioned with respect to the desired information track or tracks. The receipt of predominantly one tone or the other indicates that the head has been improperly placed, and also indicates in which direction the head has been moved with respect to the information track. This signal can then be employed to cause the head to be returned to its proper position acting in this manner as a fine positioning device. In this manner a reading and writing head can be properly placed with respect to a desired channel despite slight variations in the width of the tape or the positioning of the tape with respect to the desired position which the head might normally occupy.

In another embodiment, the guide tracks may both be recorded or placed adjacent the same side of the information track or tracks. The method of using these guide tracks is the same as that set forth above.

It is therefore an object of this invention to provide a novel form of read-write transducer positioning device which can be accurately set with respect to a desired information track or group of tracks which is to be read out of or written into.

It is another object of this invention to provide a read-write transducer positioning device which employs a system of guide channels, recorded to either side of the main information track or tracks, to aid in the accurate positioning of said transducing device.

It is a further object of this invention to provide a read-write transducer positioning device which employs a system of guide channels, recorded adjacent one side of the main information track or tracks, to aid in the accurate positioning of said transducing device.

It is another object of this invention to provide a read-write transducer positioning device which is responsive to high and low frequency guide signals to accurately position said transducing means.

It is yet another object of this invention to provide a transducer positioning device which is simple to construct and which may successfully operate over a wide variation in operating characteristics.

Other objects and features of the invention will be pointed out in the following description and claims, and illustrated in the accompanying drawing, which discloses, by way of example, the principle of the invention, and the best mode which has been contemplated for carrying it out.

In the drawing.

Similar elements are given similar reference characters in each of the respective figures.

Figure 1:
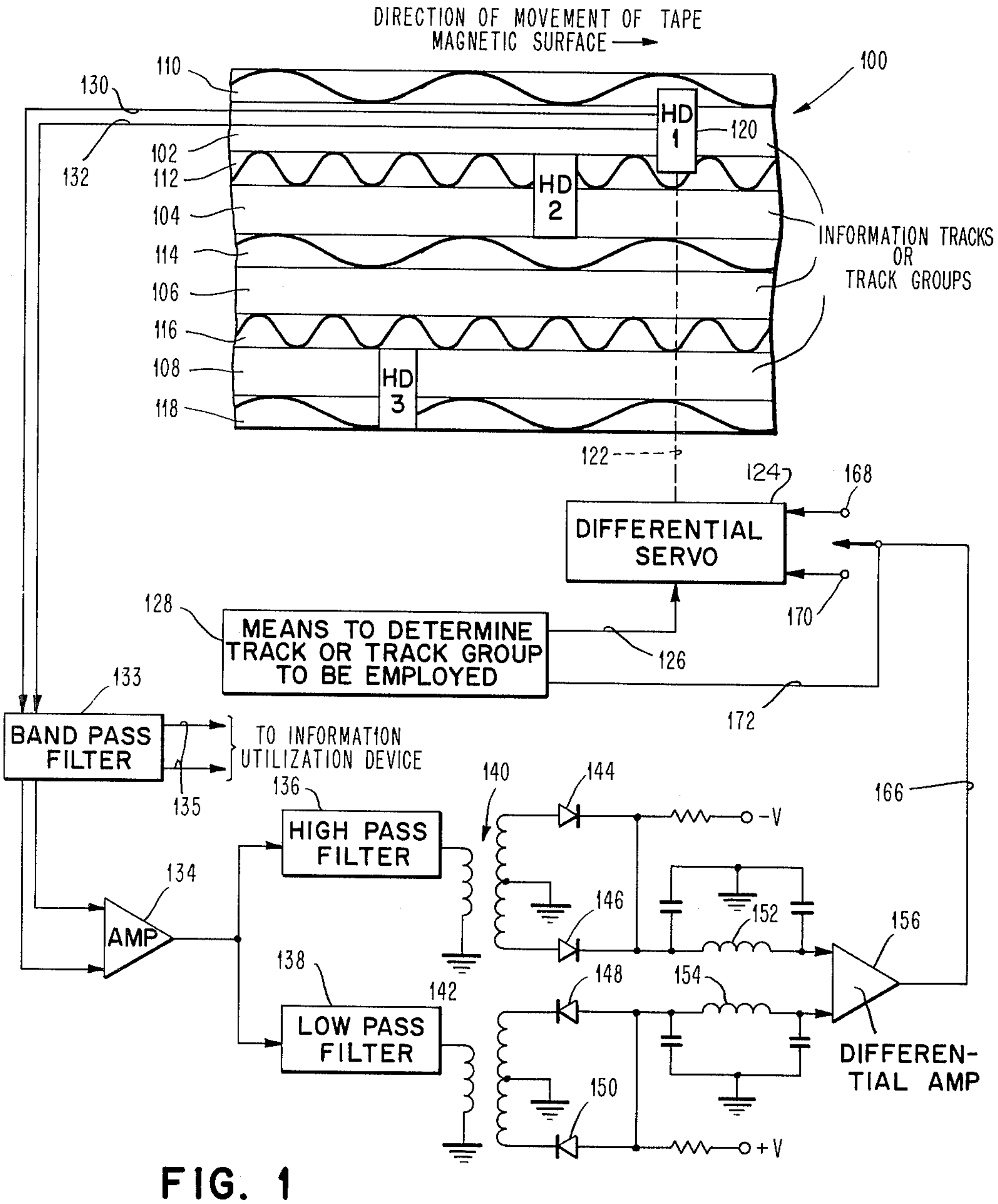
FIGURE 1 illustrates a device constructed in accordance with the basic concept of the invention.

Referring to FIGURE 1, there is shown a portion of a magnetic surface 100 upon which is recorded the information which it is desired to read. The information is arranged in a plurality of information tracks or track groups 102, 104, 106 and 108. It should be understood that the tracks 102, 104, 106 and 108 may be individual information tracks or may be groups of information tracks, considered as a single unit. The application of the principles of the invention are equally applicable to both arrangements. These information tracks or track groups are separated by a plurality of smaller guide tracks, 110, 112, 114, 116 and 118. In the tracks 110, 114 and 118, is recorded a homing tone or signal of relatively low frequency, whereas in the alternate tracks 112, and 116, there is recorded a homing tone or signal of higher frequency. The frequencies employed may be of any desired value providing that a discernible difference in frequency exists between the frequency considered to be the low frequency and that considered to be the higher frequency. For example, the low frequency may be of a frequency which is some submultiple harmonic of the lowest signal which may be present in the information track, such as 0.4X the lowest signal present, whereas the higher frequency may be a multiple harmonic of the highest signal present in the information track, such as 2½X the highest signal present. It should be understood that the representation of the various tracks upon the portion of the surface 100 is made for illustrative purposes only, and this invention is not limited to such a number of tracks. A portion of surface could be constructed as wide as desired with as many tracks placed upon it as is desired with the only provision that alternate tracks of low and high frequency homing signals or tones are provided. A transducing head 120 is placed for movement along the width of the surface 100. This head 120 is mounted upon a mechanical positioning device 122 which is controlled by a differential servo motor 124. This mechanical positioning device may be in the form of a helical screw, a link assembly, a rack and pinion or a pully arrangement. By way of example, a mechanical head positioning device of the type described in "A Large Capacity Drum File Memory System" (Welsh et al.) Proceedings of the Eastern Joint Computer Conference Dec. 10–12, 1956, at pages 136 to 138 may be conveniently employed. The helical screw illustrated is merely by way of example and the invention is not limited to a system employing such a mechanical positioning device. In response to a signal provided on the input line 126, servo 124 causes the screw 122 to turn in the proper direction and amount in order to place the head 120 in approximate alignment with the information track to be read, or recorded into. The signals along line 126 are provided from a means to determine the track to be employed 128. This means 128 may be the decoding matrix section of an instruction register in the central portion of the computer with which the storage unit is used. Thus when an instruction is set up in the instruction register, as is well known in the data processing field, the portion of the instruction which is to represent the location of the data desired, is set up in an address staticizer. The portion of the address so set up will indicate the information track or tracks in which such information is to be found. The remaining portion of the address staticized will indicate where along the length of the track such information is located. A discrete signal will be generated by the staticizer in accordance with the particular track or track group which is to be selected. This discrete signal is provided over the line 126 to the differential servo, so that the head 120 may be positioned in accordance with such an address. The surface 100 is moved to the right by means not shown so as to result in a relative movement of the information tracks with respect to the head 120. The data read by the head 120 is transmitted over a pair of leads 130 and 132 to a band pass filter 133, of conventional design, which serves to separate the information signals, recorded at intermediate frequencies from the guide signals recorded at frequencies above and below those of the information signals. This mixture of signals is due to the use of a signal head to provide for the reading of both information and guide track signals. The information signals are passed to the information utilization device (not shown) over the lines 135 from the filter. The guide signals are applied to the input of a read amplifier 134. The amplified signals are fed simultaneously to a high pass filter 136 and a low pass filter 138, both of conventional design. The output of the high pass filter 136, an A.C. wave above a given cut-off frequency (i.e. here 2½ the highest signal frequency present) is fed to the primary of a transformer 140. In a similar fashion the output of low pass filter 138, an A.C. wave below a given cut-off frequency (i.e. here 0.4X the lowest signal frequency present) is fed to the primary of a transformer 142. The secondary of transformer 140 is grounded at its center tap and has a diode connected at each of its ends. These diodes 144 and 146 have their anodes connected to the transformer and their cathodes commoned and connected to a negative bias source and to the input of a low pass filter 152. The diodes 144 and 146 serve to pass only the positive portion of the signal presented to the secondary of the transformer to the low pass filter 152. In other words only that portion of the signal which can maintain the anodes positive with respect to the negatively biased cathodes. Similarly, the secondary of transformer 142 has its center tap grounded and its ends terminating at the cathodes of diodes 148 and 150. The anodes of the diodes are connected to a positive bias source as well as low pass filter 154. The diodes serve to pass to low pass filter 154 only that portion of the signal presented to the secondary of transformer 142 which is negative, that is negative with respect to the positive bias on the anodes of the diodes 148 and 150. The low pass filters serves to convert the respective signals to D.C. levels of proper polarity and magnitude. Thus the output of filter 152 is positive and of a magnitude which represents the high frequency component of the original signal. The output of filter 154 is negative and is of a magnitude which represents the low frequency component of the original signal. These output signals are fed to a differential amplifier 156 of well-known construction, which produces an output signal on line 166 which is indicative of the algebraic sum of the input signals. That is the output of amplifier 156 produces a signal whose polarity indicates the direction of change necessary to bring about balance of its inputs and whose magnitude indicates the amount of change. The output line 166 may alternately be connected to the terminals 168 or 170 of the differential servo 124 as set forth below. The position of the input lead 166 with respect to the terminals 168 and 170 is controlled by a signal on the lead 172 from the means 128.

The basis for the alternative terminals 168 and 170 of the differential servo 124 will now be set forth. To conserve the width of the magnetic surface, that is, to provide as many information channels across the width as is possible, the procedure of providing a guide channel to the left and right of each individual track or track group of information which would always contain a track to the left of one type and a track to the right of a second type was not used. Such an approach would require the use of four guide tracks for every two tracks of information. For example, under such a procedure there would be a low frequency guide track, the information track, the high frequency guide track. This would be followed by a further low frequency guide track, the second information track and a further high frequency guide track. However, the procedure employed as can be seen from the figure, requires only five tracks to provide the same two information tracks as described above. This is due to the fact that the guide track between the two information tracks provides proper guide facilities for both of the tracks or track groups. Thus the track arrangement of the invention employs a low frequency guide track to one side, an information track or track group, a high frequency guide (which serves both information tracks), a second information track or track group. This is followed by an additional low frequency guide track to the extreme right of the second information track or track group. Thus, with respect to information track group 102 the low frequency indicates that the head is now to the left of the inforamtion track or track groups desired, whereas, the low frequency guide track would indicate as far as informattion track or track group 104 was concerned that the head was to the right of the desired placement with respect to the information track or track group. It should be noted that the terms right and left refer to relative placement with respect to the information rack and appear in the figure as top and bottom due to the direction of movement of the channels to the right. Thus it is necessary to reverse the effect that a particular frequency guide signal has upon the reading of alternate tracks. Hence, for the information track 102 and 106, that is the odd tracks on the width of the surface (starting at the top of the figure), it is desired that low frequency detection result in the movement of the head to the right, whereas, low frequency detection with regard to the tracks 104 and 108, that is, the even tracks, indicates a required movement to the left. Detection of a high frequency signal requires movement to the right with respect to tracks 104 and 108. This reversal for the various tracks or track groups, that is, the odd and the even tracks is accomplished by means of alternating the input on line 166 to the terminals 168 or 170 of the differential servo 124 to permit the placement of the head correctly with respect to the particular information track selected.

The positioning of the input line 166 with respect to terminals 168 and 170 of the servo 124 is accomplished by means of a signal impressed on the line 172 from the means 128. This signal is derived from the address decoding matrix and staticizors as stated above. It may simply be achieved by providing a common output connection for all possible track or track group selections which are odd and a separate indication for all those which are even and providing discrete levels indicative of the respective track or track group selected. Once the line 166 has been properly connected to either of the terminals 168 or 170, the course placement of the head 120 can be corrected in the proper direction and in a proper amount to bring about head and track alignment. The servo 124 is of conventional construction and wound in such a manner that the servo rotor rotates in one direction for a signal of a first polarity and in the opposite direction for a signal of a second.

The manner of operation of the system as a whole will now be set forth. The position occupied by the head 120 indicated as head position 1 is that which is normally found for a head properly aligned with respect to an information track or track group. This proper alignment finds the head riding over equal portions of the guide tracks to its left and right thus reading the signals of different frequency but in equal amplitude. The amplifier 134 may be properly adjusted to provide that when the head is in the position indicated by position 1 the amplitudes received from both channels will be equivalent. The signal is then fed to the high and low pass filters 136 and 138 respectively. The resulting A.C. waves are fed to the transformers 140 and 142. The input to transformer 140 is the high frequency guide signal whereas the input to transformer 142 is the low frequency guide signal. The diode network composed of diodes 144 and 146 serve to pass only the positive portion of the signal from the high pass filter to the low pass filter 152. In a similar fashion the diode network composed of diodes 148 and 150 serve to pass only the negative portion of the signal from the low pass filter 138 to the further low pass filter 154. The low pass filters 152 and 154 produce D.C. levels whose polarities are the same as the input signal polarity to each filter and whose magnitude is determined by the amplitude of the input. The D.C. levels, positive from filter 152 and negative from 154 are fed to the differential amplifier 156 which produces a signal which represents the algebraic sum of the inputs to it. In the condition in which the head is properly riding the respective information and guide tracks, that is the head is in proper alignment with the information track, the signal amplitudes received on the input lines of differential amplifier 155 will be equal but opposite in polarity thus effecting cancellation in the differential amplifier 156. The output signal on the line 166 will thus be zero effecting no change in the position occupied by said head 120 at position 1.

However, if upon the setting of the head 120 as shown by head position 2 by the coarse adjustment of the differential servo 124 the head is made to occupy a position whereby it no longer rides over the low frequency guide track 114 but now occupies a position so as to ride over the entire width of the guide track 112 the signal furnished to the line 144 will be considerably different in form. It should be understood that the condition illustrated and described is an extreme condition and is for illustration purposes only and that the same nature of results are achieved regardless of the amount of movement of the head from its central position. The signal supplied will now contain a large amplitude high frequency signal and a low amplitude low frequency component. This signal when fed respectively to their separate channels will produce D.C. levels which are quite different in their amplitudes. The signal fed to filter 154 will be of a rather low level whereas the signal introduced on the output of the low pass filter 152 will be of a much greater value. Thus, the differential amplifier is made responsive to a negative low value signal from filter 154 and a positive high value signal from filter 152. The differential amplifier 156 produces a signal representative of the magnitude and polarity of the difference between the two input signals and generates a signal on the line 166 in accordance with its position. This signal will then be fed to the input terminal 168 or 170 depending upon whether this has been an odd channel or an even channel the particular choice depending upon the manner of winding of the respective servo elements, and being set in accordance with a signal presented to the line 172. This signal presented on the line will be sufficient to cause the head 120 indicated in the head position 2 to be moved to the right until a signal of equal amplitude is received on both of the input lines of the differential amplifier 156. The manner of operation for the system when the head is in the position indicated as head position 3 is the reverse of that just described for head position 2. As shown in head position 3 the head now overlaps entirely the low frequency track 118 whereas it does not override in any manner the guide track 116 containing the high frequency tone or signal (also an extreme illustration). Thus the signal introduced to the input of the respective high and low pass filters contains a low portion of high frequency signal and a high portion of low frequency signal. Hence the inputs to the differential amplifier will take the following form: there will be a small positive signal from filter 152 as a result of the small component of the signal caused by the high frequency tone, whereas there will be a large negative signal introduced from the filter 154 as a result of reading the large low frequency tone component. These signals will cause the differential amplifier to produce a signal on line 166 in conformance with the polarity and magnitude of the difference between the input signals to it. The signal will be introduced to the same terminal 168 or 170 as was used in the example for head position 2. This is due to the fact that in both instances an even channel was used thereby indicating the convention to be used for those particular tracks. It should be remembered, however, that had head position 3 been indicated over the information track 106 so as to override the guide track 116 rather than 118, a high frequency signal would now indicate the fact that head 120 occupying the position as shown in head position 3 was now to the right and would cause a reversal of the switch so as to produce the necessary left shift rather than the undesired further right shift.

The requirement for the filter 133 may be removed simply by employing a plurality of heads rather than the single one shown. For example, if only one information track is used between guide tracks, then a high frequency guide read-write head, a low frequency guide read-write head and an information track read-write head need be used, whereas if a plurality of tracks in a track group must be read a single head for each information track in addition to the two separate guide heads must be provided. The output of the guide heads would then be fed directly to the read amplifier 134 (there is no requirement to keep the guide signals separate) whereas the information could be read directly to the utilization device.

Figure 2:
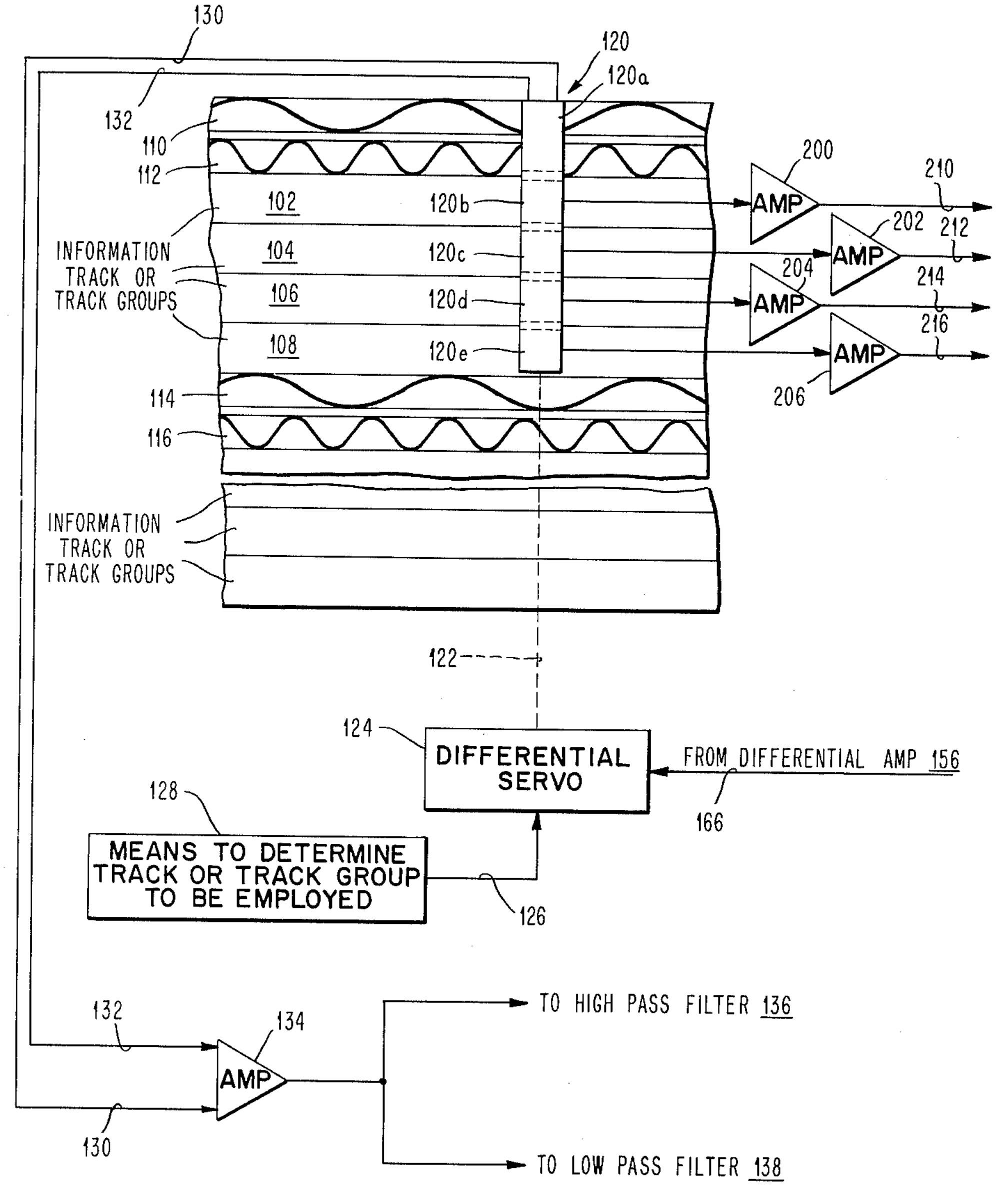
FIGURE 2 illustrates a modification of the embodiment shown in FIGURE 1.

FIGURE 2 illustrates a further modification of the device of FIGURE 1 which permits the elimination of the input reversal requirement of the differential servo 124. As shown in the figure the high and low frequency guide tracks 110, 114, 112 and 116, respectively, are now mounted adjacent the same side of the information track or track groupings 102, 104, 106 and 108. In this manner one set of guide tracks (i.e. one high and one low frequency track) may be used for a plurality of tracks or track groups, thus permitting even greater utilization of the magnetic surface. Further, by use of this approach there is no need for a reversal of the input to servo 124 depending upon the track or track group to be read. A signal of one polarity at the inputs to servo 124 will always signify an error in one direction and a signal of the opposite polarity will indicate an error in the other.

In this arrangement of FIGURE 2 a separate head is required for each track whether it be separate or part of a track group. In FIGURE 2, for illustrative purposes only, there are shown individual tracks. It should be understood that this concept may be extended or reduced without departing from the scope of the invention disclosed. Thus the data or information of tracks 102, 104, 106, and 108 are respectively read out by heads 120*b*, 120*c*, 120*d* and 120*e* to read-out amplifiers 200, 202, 204 and 206 and passed to the information utilization device over the lines 210, 212, 214, and 216. The guide track information is read out by the head 120*a* and fed over the lines 130 and 132 to the read-in amplifier 134, where it is operated upon in a manner such as set forth with respect to the device of FIGURE 1. It should be noted in the structure of FIGURE 2 that no polarity reversing switch is necessary, for the reasons set forth above, and that a filter is not required because of the separation at read out of the information and guide signals.

While the invention has been described in terms of a single head which is positionable along the entire width of the magnetic surface, it should be understood that this procedure could equally be used to provide fine adjustment for a plurality of heads fixedly mounted so as to provide one head or transducing device for each channel across the width of the surface.

It will be understood that various omissions and substitutions and changes of the form and detail of the device illustrated and in its operation may be made by thise skilled in the art, without departing from the spirit of the invention.

The embodiments of the invention in which an exclusive property or privilege is claimed are defined as follows:

1. A device for properly aligning a sensing head with one or more magnetic tracks comprising:
   (a) a first track having permanently recorded therein a series of signals of a first frequency;
   (b) a second track having permanently recorded therein a series of signals of a second frequency;
   (c) said first and second tracks being arranged to cooperate with said magnetic recording tracks;
   (d) means to sense said first and second tracks and produce an output signal in accordance with the relative strengths of the signals of said first and second tracks due to the position of the sensing head;
   (e) and means responsive to said output signal to provide further signals indicative of the direction and magnitude of any misalignment of said sensing head with said one or more magnetic tracks whereby said further signals may be employed to control the movement of said sensing head to a position of alignment with said one or more magnetic tracks.

2. A device for properly aligning a sensing head with one or more magnetic recording tracks comprising:
   (a) a first track placed adjacent to one edge of said magnetic recording track and having permanently recorded therein a series of signals of a first frequency;
   (b) a second track placed adjacent to the other edge of said magnetic recording track and having permanently recorded therein a series of signals of a second frequency;
   (c) means to sense said first and second tracks and produce an output signal in accordance with the relative strengths of the signals of said first and second tracks due to the position of the sensing head;
   (d) and means responsive to said output signal to provide further signals indicative of the direction and magnitude of any misalignment of said sensing head with said one or more magnetic recording tracks whereby said further signals may be employed to control the movement of said sensing head to a position of alignment with said one or more magnetic recording tracks.

3. A device for properly aligning a sensing head with one or more magnetic recording tracks comprising:
   (a) a first track placed adjacent to one edge of said magnetic recording track and having permanently recorded therein a series of signals of a first frequency;

(b) a second track placed adjacent said first track and having permanently recorded therein a series of signals of a second frequency;

(c) means to sense said first and second tracks and produce an output signal in accordance with the relative strengths of the signals of said first and second tracks due to the position of the sensing head;

(d) and means responsive to said output signal to provide further signals indicative of the direction and magnitude of any misalignment of said sensing head with said one or more magnetic tracks whereby said further signals may be employed to control the movement of said sensing head to a position of alignment with said one or more magnetic tracks.

4. A device for properly aligning a sensing head with one or more magnetic recording tracks comprising:

(a) a first track having permanently recorded therein a series of signals of a first frequency;

(b) a second track having permanently recorded therein a series of signals of a second frequency;

(c) said first and second tracks being arranged to cooperate with said magnetic recording tracks;

(d) means to sense said first and second tracks and produce a first output signal if a greater proportion of signal from said first track is sensed and a second output signal if a greater proportion of the signal from said second track is sensed;

(e) and means responsive to said first and second output signals to indicate the relative magnitudes of said first and second signals whereby said sensing head may be correctly aligned with said one or more magnetic recording tracks when the magnitudes of said first and second output signals are equal.

5. A device for properly aligning a sensing head with one or more magnetic recording tracks comprising:

(a) a first track placed adjacent to one edge of said magnetic recording track and having permanently recorded therein a first series of signals of a first frequency;

(b) a second track placed adjacent to the other edge of said magnetic recording track and having permanently recorded therein a second series of signals of a second frequency;

(c) means to sense said first and second tracks and produce a first output signal if a greater proportion of signal from said first track is sensed and a second output signal if a greater proportion of the signal from said second track is sensed;

(d) and means responsive to said first and second output signals to indicate the relative magnitudes of said first and second signals whereby said sensing head may be correctly aligned with said one or more magnetic recording tracks when the magnitudes of said first and second output signals are equal.

6. A device for properly aligning a sensing head with one or more magnetic recording tracks comprising:

(a) a first track placed adjacent to one edge of said magnetic recording track and having permanently recorded therein a series of signals of a first frequency;

(b) a second track placed adjacent said first track and having permanently recorded therein a series of signals of a second frequency;

(c) means to sense said first and second tracks and produce a first output signal if a greater proportion of signal from said first track is sensed and a second output signal if a greater porportion of the signal from said second track is sensed;

(d) and means responsive to said first and second output signals to indicate the relative magnitudes of said first and second signals whereby said sensing head may be correctly aligned with said one or more magnetic recording tracks when the magnitudes of said first and second output signals are equal.

7. A device for properly aligning a sensing head with respect to one or more of a number of parallel magnetic recording track areas, each area comprising:

(a) a magnetic recording track;

(b) a first track placed adjacent to one edge of said magnetic recording track and having permanently recorded therein a first series of signals of a first frequency;

(c) a second track placed adjacent to the other edge of said magnetic recording track and having permanently recorded therein a second series of signals of a second frequency;

(d) means to move said sensing head into approximately alignment with said magnetic recording track;

(e) means to sense said first and second tracks and produce an output signal in accordance with the relative strengths of the signals read from said first and second tracks due to the position of the sensing head;

(f) and means responsive to said output signal to provide further signals indicative of the direction and magnitude of any misalignment of said sensing head with said one or more parallel magnetic recording track areas whereby said means to move said sensing head may be operated to bring said sensing head into correct alignment with said one or more parallel magnetic recording track areas.

8. A device for properly aligning a sensing head with respect to one or more of a number of parallel magnetic recording track areas, each area comprising:

(a) a first track placed adjacent to one edge of said magnetic recording track and having permanently recorded therein a series of signals of a first frequency;

(b) a second track placed adjacent said first track and having permanently recorded therein a series of signals of a second frequency;

(c) means to move said sensing head into approximate alignment with said magnetic recording track;

(d) means to sense said first and second tracks and produce an output signal in accordance with the relative strengths of the signals read from said first and second tracks due to the position of the sensing head;

(e) and means responsive to said output signal to provide further signals indicative of the direction and magnitude of any misalignment of said sensing head with said one or more parallel magnetic recording track areas whereby said means to move said sensing head may be operated to bring said sensing head into correct alignment with said one or more parallel magnetic recording track areas.

9. A device according to claim 8 wherein said means responsive to the output signal comprises a low pass filter, and a high pass filter.

10. A device for properly aligning a sensing head with a magnetic recording channel comprising a first track placed adjacent to one edge of said magnetic recording channel and having permanently recorded therein a first series of signals; a second track placed adjacent to the other edge of said magnetic recording channel and having permanently record therein a second series of signals; means to sense said first and second tracks and produce an output signal in accordance with the relative strengths of the signals of said first and second tracks due to the position of the sensing head; and means responsive to said output signal to provide further signals indicative of the direction and magnitude of any misalignment of said sensing head with respect to a magnetic recording channel whereby said further signals may be employed to control the movement of said sensing head to a position of alignment with said magnetic recording channel.

11. A device as set forth in claim 10 wherein said magnetic recording channels are composed of a plurality of information tracks.

12. A device for properly aligning a sensing head with a magnetic recording channel comprising a first track and having permanently recorded therein a first series of signals; a second track having permanently recorded therein a second series of signals, both of said tracks being located to the same side of said magnetic recording track; means to sense said first and second tracks and produce an output signal in accordance with the relative strengths of the signals of said first and second tracks due to the position of the sensing head; and means responsive to said output signal to provide further signals indicative of the direction and magnitude of any misalignment of said sensing head with respect to a magnetic recording channel whereby said further signals may be employed to control the movement of said sensing head to a position of alignment with said magnetic recording channel.

13. A device for properly aligning a sensing head with respect to one of a number of parallel magnetic recording track areas, each area comprising; at least one magnetic recording track; a first track placed adjacent to one edge of said magnetic recording track and having permanently recorded therein a first series of signals; a second track placed adjacent to the other edge of said magnetic recording track and having permanently recorded therein a second series of signals; means to move said sensing head into approximate alignment with said magnetic recording track; means to sense said first and second tracks and produce an output signal indicative of the position of said sensing head with respect to said first and second tracks; and means responsive to said output signal to provide further signals indicative of the direction and magnitude of any misalignment of said sensing head with respect to a magnetic recording track area whereby said means to move said sensing head may be operated to bring said sensing head into correct alignment with said sensing head into correct alignment with said magnetic recording track areas.

14. A device for properly aligning a sensing head with respect to one of a number of parallel magnetic recording track areas, each area comprising; at least one magnetic recording track; a first track having permanently recorded therein a first series of signals; a second track having permanently recorded therein a second series of signals, both of said tracks being located to the same side of said magnetic recording track; means to move said sensing head into approximately alignment with said magnetic recording track; means to sense first and second tracks and produce an output signal indicative of the position of said sensing head with respect to said first and second tracks; and means responsive to said output signal to provide further signals indicative of the direction and magnitude of any misalignment of said sensing head with respect to a magnetic recording track area whereby said means to move said sensing head may be operated to bring said sensing head into correct alignment with said magnetic recording track areas.

References Cited by the Examiner

UNITED STATES PATENTS 3,185,972 5/1965 Sippel ------------ 340—174.1

FOREIGN PATENTS 762,699 12/1956 Great Britain.

OTHER REFERENCES 2 pages, October 1961, Tsilibes, G. N., Transducer Position Sensor IBM Technical Disclosure Bulletin, vol. 4, No. 5.

BERNARD KONICK, *Primary Examiner.*

IRVING L. SRAGOW, *Examiner.*

M. K. KIRK, V. P. CANNEY, *Assistant Examiners.*